Jan. 22, 1952

W. E. CAIRNES 2,582,948

PHONOGRAPH PICKUP UNIT

Filed May 6, 1947

INVENTOR.
William E. Cairnes
BY
Foorman L. Mueller
Atty.

Patented Jan. 22, 1952 2,582,948

UNITED STATES PATENT OFFICE 2,582,948

PHONOGRAPH PICKUP UNIT

William E. Cairnes, Chicago, Ill., assignor to Motorola, Inc., a corporation of Illinois Application May 6, 1947, Serial No. 746,211

1 Claim. (Cl. 274—1)

This invention relates generally to phonograph pickup units and in particular to a resilient mounting for the translating device of such a unit.

In the prior art various attempts have been made to provide a phonograph pickup unit in which the possibility of injuring the record due to movement of the stylus across the grooves thereof is eliminated. This problem is particularly important in phonographs used by children as they are more liable to place the pickup unit on the record improperly. As is well known, when a record is once scratched as by movement of a stylus across the grooves, the scratches cause harsh noises when the record is played making the record entirely unsatisfactory for further use. This problem is complicated because it is necessary for high fidelity reproduction that the stylus engage the grooves of the record with sufficient firmness that the stylus will accurately follow all of the undulations in the grooves. For the above reasons prior attempts to provide a pickup unit in which scratching of the record by the stylus is eliminated have resulted in complicated and expensive structures which have not been entirely satisfactory in use.

It is, therefore, an object of the present invention to provide an improved mounting for the translating device of a pickup unit whereby scratching of the record by the stylus of the translating device is substantially eliminated.

A further object of this invention is the provision of a mounting for a phonograph translating device which permits the device to be retracted into the tone arm to such a position that the stylus thereof cannot engage the record.

A still further object of this invention is to provide a mounting for a relatively flat translating device which permits the device to be mounted in a relatively narrow streamlined tone arm.

A feature of this invention is the provision of a phonograph pickup unit which includes a translating device pivotally mounted on a tone arm so that it can be retracted to a position in which the stylus does not engage the record and spring biasing means to normally position the device so that the stylus engages the record.

A further feature of this invention is the provision of a retractably mounted translating device having a blunt portion thereon which engages the record when the pickup unit is forced against the record to thereby prevent scratching the record.

A still further feature of this invention is the provision of a pickup unit including a relatively flat translating device mounted in a channel-shaped tone arm with the large dimension positioned vertically so that a relatively narrow streamlined tone arm can be used.

Further objects, features and advantages will be apparent from the following description taken in connection with the accompanying drawings in which.

In practicing my invention I provide a phonograph pickup unit including a translating device mounted in a channel-shaped tone arm. The translating device is of relatively flat configuration and is mounted with the large dimension positioned vertically so that it can be positioned in a relatively narrow channel permitting the tone arm to be streamlined. The translating device is pivotally mounted so that it can be positioned with the stylus thereof engaging the grooves of a record in the proper manner and so that it can also be pivoted to a position in which the stylus does not engage the record. A blunt projection is provided on the translating device which engages the record when the translating device is in the latter position, the blunt projection having a surface such that the record is not scratched when the projection is moved across the grooves thereof. A spring is provided for normally holding the translating device in normal position, the spring being sufficiently flexible to allow the translating device to be retracted when abnormal force is applied to the tone arm.

Figures 1, 2, 3:
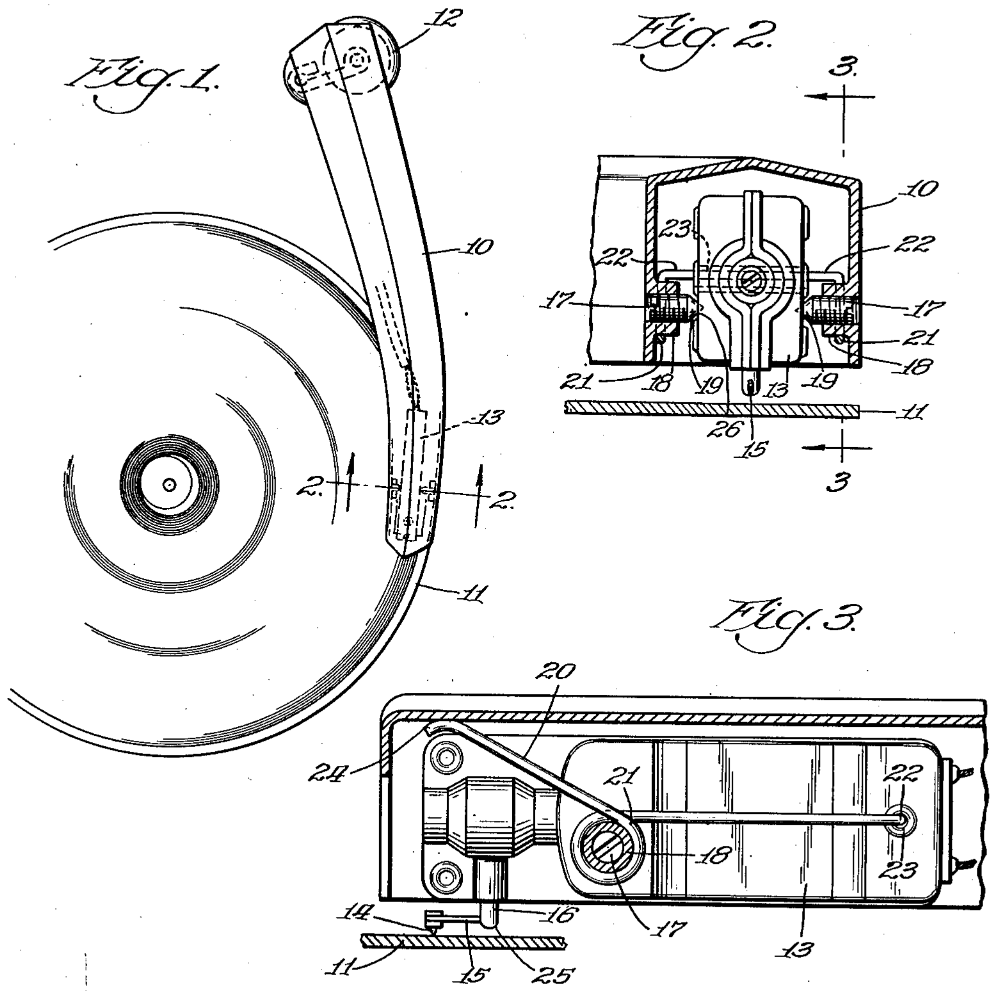
Fig. 1 is a top view illustrating the phonograph pickup unit in accordance with the invention in position on a record.
Fig. 2 is a cross-sectional view along the lines 2—2 of Fig. 1 showing the pivotal mounting of the translating device of the pickup unit.
Fig. 3 is a sectional view along the lines 3—3 of Fig. 2 showing the spring biasing means used in connection with the mounting.

In Fig. 1 there is illustrated a tone arm 10 of a phonograph which is positioned on a record 11 in the normal playing position. The tone arm 10 is supported by a post 12 which may be of any standard construction and which supports the tone arm 10 in a well known manner. The tone arm is an elongated channel-shaped member having a top portion and depending side portions. Figs. 2 and 3 illustrate the mounting of a translating device 13 within the channel-shaped tone arm 10. The translating device may be of any standard type such as a crystal unit having a housing which is shaped as a relatively thin cartridge. As is apparent in Fig. 3, the translating device includes a stylus 14 which is adapted to engage the grooves of a record to transmit the undulations recorded therein to the operating structure of the translating unit through a vibratory system including arms 15 and 16.

The translating device 13 is supported in the channel-shaped tone arm 10 by a pair of pivots 17 which are threaded in annular projections 18 provided on the side portions of the channel. The pivots 17 include pointed ends 19 which engage bearing surfaces 26 on the sides of the housing of the translating device 13. The bearing surfaces are provided on the closely spaced sides of the translating device so that the translating device can be mounted in a narrow or streamlined tone arm. For holding the translating device in the proper position on the pivots, a spring 20 is provided which is of generally U-shaped configuration, each arm including a portion 21 surrounding one of the projections 18, and an inturned end portion 22 engaging an opening 23 on the side of the translating device. The center portion 24 of the U engages the top surface of the channel-shaped tone arm 10 as is clearly shown in Fig.3.

Figure 4:
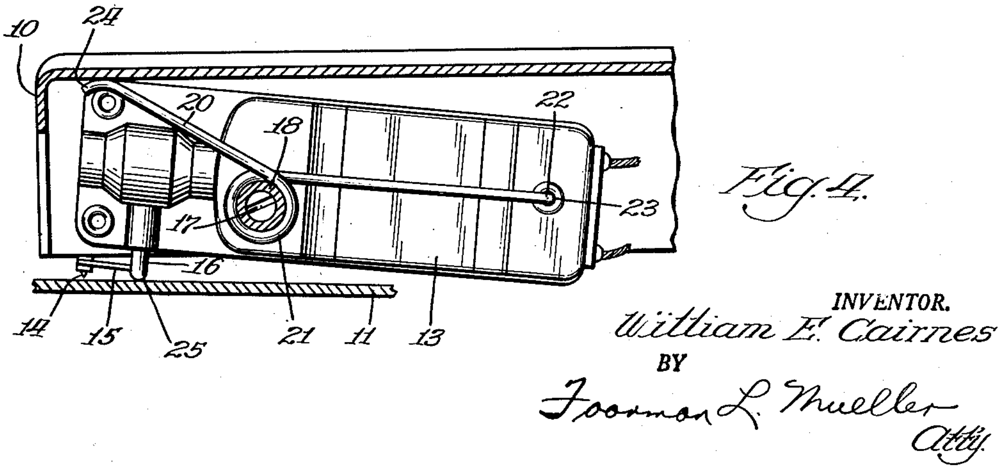
Fig. 4 is a view similar to Fig. 3 in which the translating device is retracted so that the stylus does not engage the record.

Fig. 4 illustrates the manner in which the translating device is retracted when pressure is applied to the top of the tone arm 10 tending to force the tone arm against the record. It is noted that the front part of the tone arm is pivoted upwardly in such a position that the stylus 14 is slightly removed from the surface of the record. The end 25 of the arm 16 is in engagement with the record, this end having a relatively blunt rounded surface which engages the grooves of the record. It will be apparent that when the tone arm is thus forced against the record and moved across the grooves of the record, the rounded surface 25 will not scratch the grooves as would the sharp stylus 14. Actually, the rounded surface has no harmful effect on the grooves of the record whatever. Also, as the stylus is out of engagement with the record, no objectionable noise will be produced by the reproducing system as a result of movement of the tone arm across the record in this manner.

It is apparent from the foregoing description that the spring 20 must be designed to have the proper resilience to hold the translating device in a substantially horizontal position as shown in Fig. 3 when the weight of the tone arm is exerted thereon and must be sufficiently flexible that when a slight additional pressure is applied to the tone arm, the translating device will be retracted into the tone arm to the position in which the stylus does not engage the record. The portion of the translating device which engages the record need not be the rounded surface 25 on the arm 16 of the vibratory translating system but may be a projection provided on some other portion of the translating device 13. Such portion must, however, have a rounded surface arranged to engage the record when the translating device is retracted.

Pickup units constructed in accordance with the invention have been found to be highly satisfactory for preventing scratching of the record due to unintentional movement of the tone arm across the grooves thereof. The mounting also provides a suffciently firm engagement of the stylus on the record to produce high fidelity translation of the sounds recorded thereon. Another important feature of the invention is that the resilient mounting for the translating device reduces extraneous vibrations thereof causing sounds generally referred to as "needle talk." The resilient mounting tends to dampen out such vibrations providing better reproduction of the sounds recorded.

As the mounting is of very simple and inexpensive construction, it is particularly adaptable to be incorporated in phonographs designed for use for children wherein the danger of scratching is greatest and will, therefore, result in a much longer life of the records. Also the mounting permits the tone arm to be streamlined and, therefore, conform more accurately to modern styling.

Although I have described one form in which my invention may be embodied, it is apparent that various changes and modifications can be made therein without departing from the intended scope of the invention as defined in the appended claim.

I claim:

A pick-up unit for translating undulations recorded in the grooves of a record into electrical signals, including in combination, a tone arm, a translating device including a housing, an arm extending from said housing supporting a record engaging stylus and a projecting portion having a rounded end, and mounting means for supporting said translating device on said tone arm including a pivotal portion connected to said housing intermediate the ends thereof, said projecting portion being positioned intermediate said stylus and said pivotal portion, said mounting including spring means having portions engaging said tone arm and said housing for biassing said translating device about said pivotal portion to a position in which said stylus extends below said projecting portion for engaging the grooves of the record, said spring means being relatively more flexible than said supporting arm so that when said tone arm is forced against the record, said spring means flexes to permit rotary movement of said translating device before said supporting arm flexes substantially to change the position of said stylus with respect to said translating device, whereby said translating device is rotated to a position in which said stylus is removed from the record and said rounded end of said projection portion engages the record and the record is therefore not substantially damaged.

WILLIAM E. CAIRNES.

REFERENCES CITED

The following references are of record in the file of this patent:

UNITED STATES PATENTS

| Number | Name | Date |
|---|---|---|
| 962,081 | Edison | June 21, 1910 |
| 1,930,544 | Victor | Oct. 17, 1933 |
| 2,174,692 | Dunning | Oct. 3, 1939 |
| 2,320,416 | Dally | June 1, 1943 |
| 2,325,343 | Semple | July 27, 1943 |
| 2,331,122 | Jones | Oct. 5, 1943 |
| 2,374,842 | Shively et al | May 1, 1945 |
| 2,455,913 | Bauer | Dec. 14, 1948 |